(No Model.)
C. PARIDY.
BAND CUTTER AND FEEDER FOR THRASHING MACHINES.
No. 331,536. Patented Dec. 1, 1885.
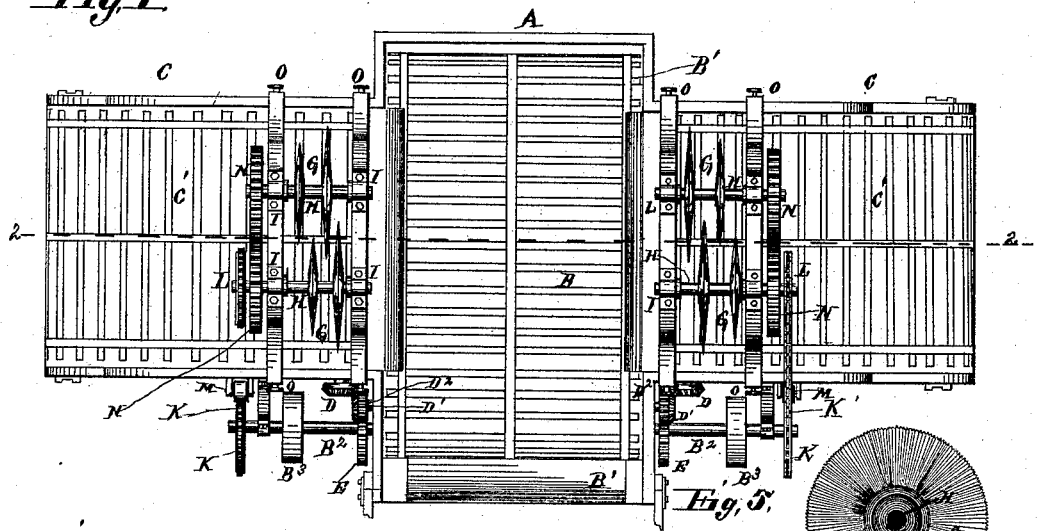
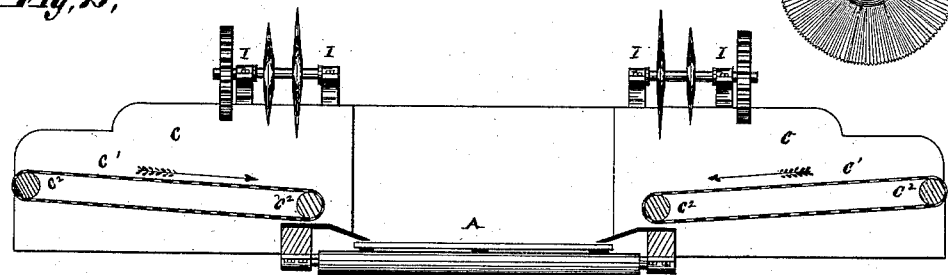
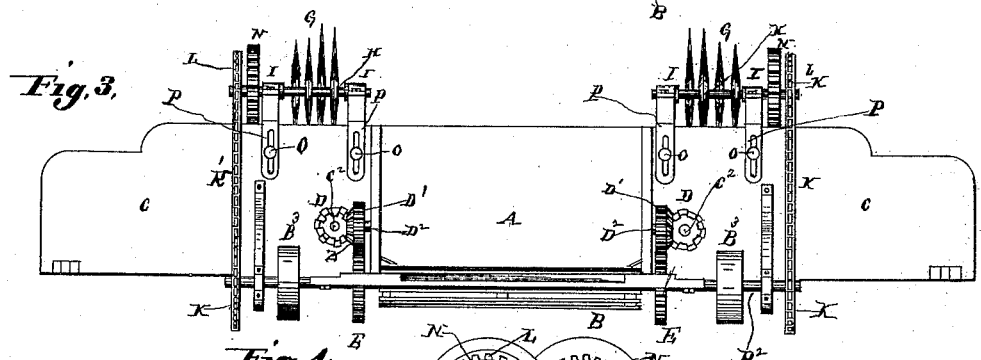
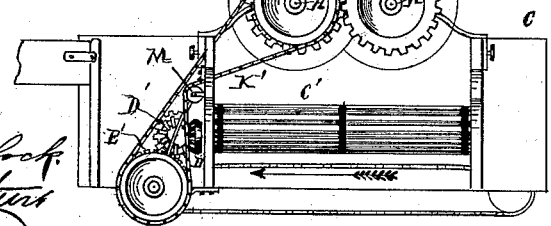
Attest:
Geo. L. Wheelock
Edward Stun
Inventor:
Chas Paridy
By Knight Bros
attys

UNITED STATES PATENT OFFICE.

CHARLES PARIDY, OF EAST ST. LOUIS, ILLINOIS.

BAND-CUTTER AND FEEDER FOR THRASHING-MACHINES.

SPECIFICATION forming part of Letters Patent No. 331,536, dated December 1, 1885.

Application filed August 24, 1885. Serial No. 175,183. (No model.)

*To all whom it may concern:*

Be it known that I, CHARLES PARIDY, of East St. Louis, in the county of St. Clair and State of Illinois, have invented a certain new and useful Improvement in Band-Cutters and Feeders for Thrashing-Machines, of which the following is a full, clear, and exact description, reference being had to the accompanying drawings, forming part of this specification, and in which—

Figure 1 is a top view of my improved device. Fig. 2 is a vertical section taken on line 2 2, Fig. 1. Fig. 3 is a front elevation of my improved device. Fig. 4 is an end elevation, and Fig. 5 represents one of the vertical disks.

My invention relates to an improved machine for cutting the sheaf-bands and feeding the loosened grain to a thrashing-machine; and my invention consists in features of novelty hereinafter fully described, and pointed out in the claims.

Referring to the drawings, A represents a cradle, the forward end of which is located at the mouth of the thrashing-machine when in use. This cradle is provided at bottom with an endless traveling apron, B, supported on rollers B', driven from the machine through means of a shaft, B², passing through the front roller and provided with pulleys B³, to receive belts from the machine. On each side of the cradle is a wing, C, provided with an endless traveling apron, C', supported on rollers C². The inner roller of each wing is provided with a bevel-wheel, D, into which meshes a similar wheel, D', on a shaft, D², journaled in the body of the cradle. Meshing into this latter wheel is a cog-wheel, E, on the shaft B². These last-mentioned aprons are thus operated direct from the machine. The sheaves of grain to be thrashed are thrown upon these aprons, and as the aprons move in the direction of the arrows, Fig. 2, the sheaves are carried toward the cradle and delivered upon the endless apron of the cradle. Before reaching the cradle, however, the sheaves pass under rotating band-cutters G, supported on the shafts H, journaled in boxes I, secured to the wings of the cradle. These cutters consist of disks, which are preferably serrated, as shown in Fig. 5, to form cutting-edges. I prefer to arrange the disks, as shown in Fig. 2, with a large one on the inside and a smaller one on the outside, the result being that the bands of the large sheaves will be cut by the small disks, and the bands of the smaller sheaves by the large disks or cutters. The cutters are revolved by connection with the shaft B², the connection I have shown consisting of an endless chain, K', passing over a chain-wheel, K, on the shaft B², and over similar wheels, L, on the ends of one of the disk-shafts, it being preferred to use two sets of disks on each wing, as shown in Fig. 1. The lower part of the chain passes over an idler-roller, M, journaled to the wings of the cradle, as shown in Fig. 1. The shafts of each pair of cutters are connected by cog-wheels N, so that a positive rotation is given to both sets of disks or cutters. The cutters are four in number on each wing and arranged overlapping, as I have shown them, so that it is impossible for any sheaf, large or small, to pass under them without being cut.

The boxes in which the shafts of the cutters are journaled are supported on arms or brackets, as shown in Fig. 3, which are secured to the wings of the cradle by bolts O, passing through slots P in the arms, to permit of vertical adjustment of the cutters or disks.

I am aware that it has been proposed to construct a band-cutter of an endless apron and a superposed cutter rotating in a plane transverse to the apron, or a series of superposed cutters rotating in planes parallel with the said apron; but such devices are not the equivalents of my invention, and I hereby disclaim novelty in any feature or features which my device may have in common therewith. It is obvious that if a single knife is employed it must extend close enough to the endless apron to sever the bands of the smallest sheaves, and if a knife having such proximity to the said carrier is placed transversely thereto it is evident that the larger sheaves will come in contact with the side thereof and their progress be retarded to a greater or less extent. To obviate this difficulty, I employ a plurality of knives increasing in diameter in the direction in which the sheaves are carried, and to render certain the cutting of the bands of all the sheaves I arrange said cutters so that their edges overlap.

I claim as my invention—

1. In a band-cutter, the combination, with an endless belt or apron, of a plurality of superposed cutters increasing in diameter, as described, and rotating in planes transverse to the said endless apron, for the purpose set forth.

2. In a band-cutter, the combination, with an endless belt or apron, of a plurality of superposed rotary shafts placed parallel with said apron, and a plurality of cutters increasing in diameter, as described, secured to each shaft, the cutters on the respective shafts overlapping, in the manner and for the purpose set forth.

CHARLES PARIDY.

In presence of—
  BENJN. A. KNIGHT,
  JOSEPH WAHLE.